(12) United States Patent  (10) Patent No.: US 7,847,846 B1
Ignjatovic et al.  (45) Date of Patent: Dec. 7, 2010

(54) CMOS IMAGE SENSOR READOUT EMPLOYING IN-PIXEL TRANSISTOR CURRENT SENSING

(75) Inventors: Zeljko Ignjatovic, Rochester, NY (US); Mark F. Bocko, Caledonia, NY (US)

(73) Assignee: University of Rochester, Rochester, NY (US)

( * ) Notice: Subject to any disclaimer, the term of this patent is extended or adjusted under 35 U.S.C. 154(b) by 805 days.

(21) Appl. No.: 11/749,510

(22) Filed: May 16, 2007

Related U.S. Application Data

(60) Provisional application No. 60/800,420, filed on May 16, 2006.

(51) Int. Cl.
H04N 3/14 (2006.01)

(52) U.S. Cl. .................. 348/301; 348/302; 348/308; 250/208.1

(58) Field of Classification Search ............. 348/308
See application file for complete search history.

(56) References Cited

U.S. PATENT DOCUMENTS

| | | | |
|---|---|---|---|
| 5,471,515 A | 11/1995 | Fossum et al. | |
| 5,949,483 A | 9/1999 | Fossum et al. | |
| 6,005,619 A | 12/1999 | Fossum | |
| 6,084,229 A | 7/2000 | Pace et al. | |
| 6,252,217 B1 * | 6/2001 | Pyyhtia et al. | 250/208.1 |
| 6,320,617 B1 | 11/2001 | Gee et al. | |
| 6,493,030 B1 | 12/2002 | Kozlowski et al. | |
| 6,535,247 B1 | 3/2003 | Kozlowski et al. | |
| 6,587,146 B1 | 7/2003 | Guidash | |
| 6,697,111 B1 | 2/2004 | Kozlowski et al. | |
| 6,777,660 B1 * | 8/2004 | Lee | 250/208.1 |
| 6,940,551 B2 | 9/2005 | Merrill | |
| 7,023,369 B2 * | 4/2006 | Bocko et al. | 341/143 |
| 7,145,123 B2 * | 12/2006 | Lule et al. | 250/208.1 |
| 7,215,369 B2 * | 5/2007 | Beck et al. | 348/308 |
| 7,282,685 B2 * | 10/2007 | Boemler | 250/208.1 |
| 7,466,255 B1 * | 12/2008 | Ignjatovic et al. | 341/143 |
| 2005/0088554 A1 * | 4/2005 | Scott-Thomas et al. | 348/294 |
| 2008/0259182 A1 * | 10/2008 | Karim et al. | 348/230.1 |
| 2008/0309800 A1 * | 12/2008 | Olsen et al. | 348/241 |
| 2009/0002533 A1 * | 1/2009 | Chen et al. | 348/301 |
| 2009/0002536 A1 * | 1/2009 | Nakamura et al. | 348/308 |

OTHER PUBLICATIONS

Yang, J. et al., A 3MPixdel Low-Noise Flexible Architecture CMOS Image Sensor, 2006 IEEE International Solid-State Circuits Conference, Session 27, Feb. 8, 2006.

* cited by examiner

Primary Examiner—Ngoc-Yen T Vu
(74) Attorney, Agent, or Firm—Blank Rome LLP

(57) ABSTRACT

In an image sensor, the current through the in-pixel readout transistor is sensed by a circuit that is external to the pixel, and according to the measured current value a feedback current is supplied to charge the read-line parasitic capacitance. The feedback current is supplied by a circuit that also is external to the pixel area. The amplifier structure is reconfigurable so that it can be used both to read out and to reset the pixel.

12 Claims, 9 Drawing Sheets

CMOS IMAGE SENSOR READOUT EMPLOYING IN-PIXEL TRANSISTOR CURRENT SENSING

REFERENCE TO RELATED APPLICATION

The present application claims the benefit of U.S. Provisional Patent Application No. 60/800,420, filed May 16, 2006, whose disclosure is hereby incorporated by reference in its entirety into the present application.

FIELD OF THE INVENTION

The present invention is directed to CMOS image sensors and specifically to designs that employ readout transistor current sensing and feedback circuits to increase current driving capabilities and readout speed. The readout amplifier is reconfigurable and may be employed in both the reset and readout phases of the image sensor operation.

DESCRIPTION OF RELATED ART

Two technologies are dominant in the field of image capture—the CCD and CMOS image sensors. Charge-coupled-device (CCD) imagers were first developed in the 1970's in the defense sector but quickly found acceptance among professional astronomers when they began using CCD cameras instead of photographic film. There were several advantages that favored CCD cameras over photographic film:

- CCD cameras are up to 100 times more sensitive than film
- CCD images are readily digitized, eliminating film-processing
- CCD based cameras can be configured to have a much greater dynamic range than film, so they can more easily capture both faint and bright details in a single exposure Throughout the last two decades, CCD's have been the most widely used imaging technology. They have continued to improve, and their principal advantages such as sensitivity (or quantum efficiency) of about 80%, very high dynamic range (up to five orders of magnitude) and linearity remain the highest among all commercially available image sensors. However, the biggest disadvantage of CCD imagers is their small format and/or high price due to the fact that CCD sensors rely on specialized fabrication processes that require dedicated and costly manufacturing lines. The drawbacks of CCD imaging technology are the following:

- High-price due to specialized fabrication technology.
- High-power consumption.
- Random pixel access is not possible, i.e., pixels must be read out sequentially, making it impossible for CCD imagers to easily access a subset of pixels within an image.
- Low yields that are caused by a huge area (over 50%) of the imager being covered by a thin or inter-poly oxide that is prone to oxide punch-through
- Data is transferred from the imager in the form of analog charge packets. Due to losses, there is a maximum safe shifting distance, limiting the practical size of the image sensor.
- Relatively slow frame rates.

By the late 1990's CMOS image sensors began replacing CCD's in less demanding imaging applications. CMOS is the prevalent technology for digital circuit designs due to its favorable power-speed tradeoff and the high level of integration possible. As a result, CMOS has also attracted significant efforts toward implementation in a variety of mixed-signal designs. Thus, both analog preprocessing (filtering, amplification and A/D conversion) and digital processing have been combined in single-chip designs that may be fabricated with relatively inexpensive processes. CMOS technology also may be used to create inexpensive and effective image sensors. Although the sensitivity, dynamic range, and linearity of CMOS imagers are inferior to CCD imagers, CMOS imagers have other advantages. For example, CMOS image sensors can be made at standard manufacturing facilities that produce almost 90% of all semiconductor chips, which significantly decreases their design and manufacturing costs. Along with less expensive design and manufacturing, CMOS imagers have the following advantages:

- Two orders of magnitude smaller power consumption in comparison to CCD imagers. This is a great advantage in battery-powered portable applications.
- Random access to individual pixels within the imager. In CMOS imagers both the photodetector and the readout electronics are part of each pixel. This allows the charge from each photodetector to be converted into voltage/current values that can be randomly addressed and read out. Column and row addressability allows for window-of-interest readout (windowing). The windowing provides a greater flexibility in applications that need image processing (e.g. image compression, motion detection, or target tracking).
- Intra-pixel amplification and analog-to-digital conversion accommodate faster frame rates. This advantage is particularly important in machine-vision and motion-analysis applications.
- Transport of the pixel readout data in digital form rather than analog simplifies driving high-speed signals off-chip.
- CMOS technology allows most of the digital signal processing to be performed on-chip (e.g. image compression, color encoding, anti jitter algorithms, multi-resolution imaging, motion tracking, and control over wireless transmission links).

Small pixel area (high spatial resolution), high dynamic range (equally good response to both low and high light intensities), high linearity, and high frame rate are the most important features required of CMOS imager designs. Recently, with the development of a variety of the battery-powered devices, low power consumption has also emerged as an important requirement. Thus pixel readout circuits have become a critical design element of CMOS imagers and a variety of approaches have been employed, which differ mostly by the number of pixels serviced by a single readout circuit. Designs range from readout circuits dedicated to each pixel up to circuits that are used to read out blocks of pixels, the various designs making different trade-offs in size, power, and performance.

The Active Pixel Sensor (APS) readout design proposed in E. R. Fossum, S. Mendis, S. E. Kemeny, "Active Pixel Sensor with Intra-Pixel Charge Transfer", U.S. Pat. No. 5,471,515, November 1995, is used in nearly all commercial CMOS image sensors. The APS design places an amplifier at every pixel. In the APS design, the photodetector is isolated from the readout lines reducing crosstalk and charge loss, which was a significant drawback of previous Passive Pixel Sensor designs. The photodetector may be implemented as a photogate, as taught in E. R. Fossum, S. E. Kemeny, B. Pain, "Active Pixel Sensor with Multiresolution Readout", U.S. Pat. No. 5,949,483, September 1999, or as a photodiode, as taught in E. R. Fossum, "Quantum Efficiency Improvements in Active Pixel Sensors", U.S. Pat. No. 6,005,619, December 1999. Also, it could be implemented as a pinned photodiode, as taught in R. C. Gee, P. P. Lee, T. H. Lee, E. R. Fossum, "CMOS Active Pixel Sensor Using a Pinned Photo Diode", U.S. Pat. No. 6,320,617 B1, November 2000, where the collected charge is transferred through a transfer gate to a floating diffusion area for charge-to-voltage conversion prior to the readout operation.

As shown in FIG. 1, such an image sensor 100 includes, at each pixel unit 102, a photodetector 104 connected to a reset transistor Q1 106 to supply a reset signal from a voltage source VDD when a reset signal RST is received at the gate of the transistor 106. The photodetector 104 is isolated by means of the readout transistor Q2 108 placed at the pixel, which is connected to a common current source $Q_{row}$ 110 outside the pixel area to form a source-follower type amplifier. An additional switch Q3 112 at the pixel site is used to accommodate multiplexing. In the three-transistor (3T) APS design, the transistor Q1 106 is used to reset the photodetector to an initial voltage level. Each pixel is read in two phases. The first is the reset phase, where the photo-element is connected to a supply voltage $V_{DD}$ through the reset switch Q1 106. The second phase is the integration phase, where the photo-element accumulates photo-generated charge. At the end of the integration phase, the Q3 switch 112 turns on, connecting the amplifier transistor Q2 108 to the external current source $Q_{row}$ 110. The output voltage is then sampled in a correlated double sampling (CDS) circuit 114. FIG. 2 shows a chip micrograph of the image sensor 100 of FIG. 1.

Although APS designs have been able to realize many of the advantages associated with CMOS image sensors, process variation in the transistors located at the pixels cause relatively high DC offset and gain variation related fixed pattern noise (FPN) as opposed to CCD's that intrinsically have low FPN due to the absence of active devices at the pixels. Furthermore, the minimum size readout transistors used in APS pixel designs introduce excess 1/f noise and thermal channel noise thereby reducing the dynamic range of CMOS imagers, which remains less than the dynamic range of CCD imagers. In order to reduce the DC offset related FPN and 1/f noise of the readout transistors correlated double sampling (CDS) techniques have been proposed. In the conventional CDS method the terminal voltage of the photo-detector is sampled twice; once after the reset phase and once after the integration phase. The two voltage values are subtracted in an external CDS circuit and the resulting difference voltage corresponds to the incident light intensity (to first order). Thus, the DC offset noise is cancelled and the 1/f noise is differentiated, which greatly attenuates it due to its slowly varying nature.

There are two CDS approaches that differ by the time instances at which the reset and readout samples are taken. If CDS is performed such that the voltage corresponding to the end of the reset phase is sampled first following by the voltage sample after the integration phase, the DC offset related FPN and reset noise are removed. However, even though the 1/f noise is differentiated, it is poorly attenuated because the 1/f noise samples are weakly correlated due to the relatively large time interval between samples. Another disadvantage of this CDS approach is that it requires a separate capacitive storage element for each pixel. The capacitive element may be placed at the pixel site as proposed in R. M. Guidash, "Three Transistor Active Pixel Sensor Architecture with Correlated Double Sampling", U.S. Pat. No. 6,587,146, July 2003, and R. B. Merrill, "Active Pixel Sensor with Noise Cancellation", U.S. Pat. No. 6,940,551 B2, September 2005; however, these approaches require that additional transistors be placed at the pixel site which reduces the pixel area that otherwise might be used for light gathering. The capacitive elements could be placed external to the pixel area; however, this approach may be prohibitively expensive in terms of silicon area and it has been shown that the CDS circuits may require as much area as the imaging region itself, see FIG. 2 for an example.

The other CDS approach reverses the sampling procedure of the previous method. In this second method the voltage at the end of the light integration phase is sampled first followed by sampling the photo-detector voltage after the reset operation. These two values are subtracted in CDS circuits to remove the DC offset and attenuate the 1/f noise. The time difference between the sampled voltage values is now much shorter than in the first CDS method, so that the 1/f noise samples are more highly correlated and thus more greatly attenuated by differentiation. This CDS method requires only one capacitive element per column, which consumes much less silicon area than the previous CDS method. However, this second method doubles the reset noise contribution which becomes more prominent with technology scaling, i.e., as the photodiode capacitance, C, decreases the reset voltage noise power spectral density, kT/C, increases.

Another important disadvantage of conventional APS image sensors, which are based on a source-follower amplifier at each pixel site, is the relatively large gain error among the pixels of the imager. As a result, there is relatively large gain related FPN. As stated above, the APS design is a source-follower structure that has a voltage closed-loop gain given by Eq. (1), $$A = \frac{g_m r_{load}}{1 + g_m r_{load}} \quad (1)$$

where $g_m$ is the transconductance of Q2 (see FIG. 1) and $r_{load}$ is the load resistance driven by Q2 during the readout phase. It has been shown in practice that the closed-loop gain A is somewhat larger than 0.8, which means that the open-loop gain $g_m r_{load}$ is equal to 4. This value for the open-loop gain is not large enough to stabilize the closed-loop gain A, i.e., if there is variation of either the transconductance $g_m$ or the equivalent load resistance $r_{load}$, the closed loop gain may change significantly. For example for the numbers given above, a 10% change in transconductance results in a 2% change in the closed loop gain, A. Another important disadvantage of the conventional APS structure is that its speed is limited by the current driving capabilities of the in-pixel source-follower transistor, which usually is chosen to be a minimum size transistor to maintain high fill factor. Therefore, the small in-pixel transistor of the standard APS limits the speed of the imager—more specifically it slows down positive voltage transients on the readout lines. The size of the in-pixel source-follower transistor and therefore its current driving capability continue to scale down in more aggressive image sensor technologies, while at the same time the capacitance of the readout lines do not scale down as quickly. Hence, the limited speed problem becomes more prominent as the CMOS technology is scaled and the pixel count of the image sensor increases, specifically more pixels must be read while maintaining the same number of frames per second, therefore each pixel must be read faster. Limited readout speed reduces the performance of correlated double sampling because the two consecutive samples cannot be obtained quickly enough (the sampling speed becomes slower than 1/f noise corner frequency) resulting in leakage of the 1/f noise power into the signal band. It has been shown in J. Yang, K. G. Fife, L. Brooks, C. G. Sodini, A. Betts, P. Mudunuru, H. Lee, "A 3 MPixel Low-Noise Flexible Architecture CMOS Image Sensor", Digest of Technical Papers, 2006 IEEE International Solid-State Circuits Conference, 496-497, (2006), that the 1/f noise power that is not completely attenuated by the CDS dominates the readout noise in modern CMOS image sensors.

In order to improve the gain related FPN problem arising in APS designs, the Active Column Sensor (ACS) design was proposed in M. A. Pace, J. J. Zarnowski, "Complementary Metal Oxide Semiconductor Imaging device", U.S. Pat. No. 6,084,229, July 2000. The ACS schematic is shown in FIG. 3 as 300. The main difference between the APS and ACS approaches lies in the design of the amplifier. While the APS design employs a source-follower, the ACS employs a differential amplifier deployed as a unity-gain buffer.

The pixel unit in the ACS design contains three transistors. The reset transistor Q1 106 connects the photo-element to the reset voltage during the reset operation. Transistor Q2 108 serves as a switch to multiplex the in-pixel transistor Q3 112 to the common amplifier circuit shared among the pixels of one row. The remainder of the amplifier circuit is placed outside of the pixel area. The in-pixel amplification transistor Q3 112 together with the external transistors Q4 302 and Q5 304 constitute an input differential pair of a unity gain differential amplifier (UGA). The transistor Q8 306 provides current biasing to the differential pair. The current mirror Q6 308 and Q7 310 provides an active load to the differential pair. The output of the amplifier is tied to the negative input providing negative feedback, thus creating a unity gain buffer circuit topology. The main advantage of the ACS design over the APS design is that the open-loop gain can be increased significantly without increasing the size of the in-pixel transistors. This may be achieved by placing cascode transistors outside the pixel area to boost the open-loop gain in the UGA structure. By increasing the open-loop gain, device parameter variation does not affect the closed-loop gain associated with each pixel as much as in the APS design. Consequently, significantly lower gain related FPN has been reported for the ACS design.

Correlated double sampling may be employed in ACS designs to remove the dc offset, 1/f noise and reset noise. Similar to APS, there are two CDS methods that may be employed with the ACS approach. During the reset phase, both switches Q1 and Q2 are turned on. The transistor Q1 connects the photo-element to the reset voltage value $V_{reset}$. The transistor Q3 is connected to the amplifier's body through the bus lines. As a result, a unity-gain differential amplifier UGA is formed and it outputs the value $V_{out\_reset}$, which ideally is equal to the reset voltage value. This output voltage value is stored on an external capacitance. At the conclusion of the reset phase the pixel is disconnected from the reset voltage and bus lines and begins the light integration phase. Incident light creates charge that reduces the voltage at the photo-detector terminal. After the integration phase concludes, the pixel is selected by turning on transistor Q2. A corresponding output voltage value $V_{out\_integration}$ from the unity-gain buffer is then stored in the CDS circuit and subtracted from the initial sample $V_{out\_reset}$. It has been shown that in addition to reduced gain related FPN, the ACS structure exhibits somewhat faster settling times than the APS design due to the higher current drive capability of the differential amplifier structure. Recall that the speed of the APS structure is limited by the current driving capability of the in-pixel source-follower transistor, which is usually chosen to be minimum size to achieve high fill factor. While the negative voltage swings on the readout-lines could be sped up by increasing the biasing current value in the standard APS designs, the positive swings are always limited by the size of the small in-pixel transistor. In contrast the transistor Q6 of the ACS design, which provides current for the positive voltage swings on the ROW_BUS1 line, does not have to be a minimum size transistor because it is external to the pixel area thereby allowing faster settling times and increased readout speed. Hence, in general, the speed of the ACS may be improved by increasing the biasing currents and size of the active load transistors. However, the overall speed improvement of the ACS is rather modest because the parasitic capacitance of the ROW-BUS2 line is still driven by the small size transistor Q5 that has to be matched to the in-pixel transistor Q3. This bus line, which heavily loads the transistor Q5 and has to follow output value changes, slows down the overall response. Therefore, as the CMOS technology continues to scale, the ACS is facing the same speed limitation problem as the standard APS.

SUMMARY OF THE INVENTION

An objective of the present invention is to combine the small pixel size and low power consumption of the conventional APS design with faster settling times and correspondingly increased readout speeds. A further objective is to reduce reset noise by utilizing the in-pixel amplifier in a negative feedback configuration.

To achieve the above and other objectives, the present invention is directed to a current sensing active pixel (CSAP) sensor design in which the current through the in-pixel readout transistor is sensed by a circuit that is external to the pixel and according to the measured current value a feedback current is supplied to charge the read-line parasitic capacitance. The feedback current is supplied by a circuit that also is external to the pixel area. The amplifier structure is reconfigurable so that it can be used both to read out and to reset the pixel. The in-pixel readout transistor is in a source-follower configuration during the pixel readout operation, and during the pixel reset operation it is a common-source type amplifier, similar to the method proposed in the following: L. J. Kozlowski, D. L. Standley, "Low-Noise Active Pixel Sensor for Imaging Arrays with Global Reset", U.S. Pat. No. 6,493,030, December 2002; L. J. Kozlowski, D. L. Standley, "Compact Low-Noise Active Pixel Sensor with Progressive Row Reset", U.S. Pat. No. 6,697,111 B1, February 2004; and L. J. Kozlowski, D. L. Standley, "Active Pixel Sensor with Capacitorless Correlated Double Sampling", U.S. Pat. No. 6,535,247, March 2003. During both the readout and reset operations the in-pixel amplifier operates in conjunction with the external circuit that provides current sensing and feedback.

The present invention allows a new CMOS image sensor readout that is several hundred times faster than standard CMOS active pixel sensor (APS) designs. In addition to the obvious advantages of higher frame rates for large pixel arrays and faster electronic shutter, increasing the readout speed reduces read noise by decreasing the time interval between the successive measurements in correlated double sampling. In the new method the in-pixel readout transistor is biased by a constant current source shared by the pixels of a row/column. The transistor is used in the source-follower configuration however, in contrast to standard APS designs the biasing current through the readout transistor is monitored and negative feedback forces the current to a fixed value. The external voltage required to maintain the fixed current is then sensed.

The present invention retains the high fill factor of APS designs by employing only three transistors at the pixel site. The transistor current sensing and feedback circuit is external to the pixel so its transistors may be sized to provide much higher current driving capability thereby enabling readout speeds that are several hundred times faster than standard APS designs. Due to its high speed, the present invention can more effectively employ correlated double sampling (CDS) significantly reducing the read noise contribution of the 1/f noise of the source follower transistor.

The present invention also reduces gain variation related fixed pattern noise (FPN) in comparison to conventional APS designs by increasing the effective open-loop gain of the source-follower amplifier. Finally, the new method greatly reduces reset noise by placing the reset transistor in the feedback path of an inverting amplifier which actively drives the photodiode reset voltage to a reference voltage level. The readout amplifier is reversible and therefore may be used in both the reset and the readout phases. The present invention also may be employed in multiplexed configurations in which neighboring photodetectors share a common amplification transistor thereby enabling designs with 1.5 transistors per pixel while still performing the aforementioned functions.

BRIEF DESCRIPTION OF THE DRAWINGS

Preferred embodiments of the present invention will be disclosed in detail with reference to the drawings, in which.

DETAILED DESCRIPTION OF THE PREFERRED EMBODIMENTS

Figure 1:
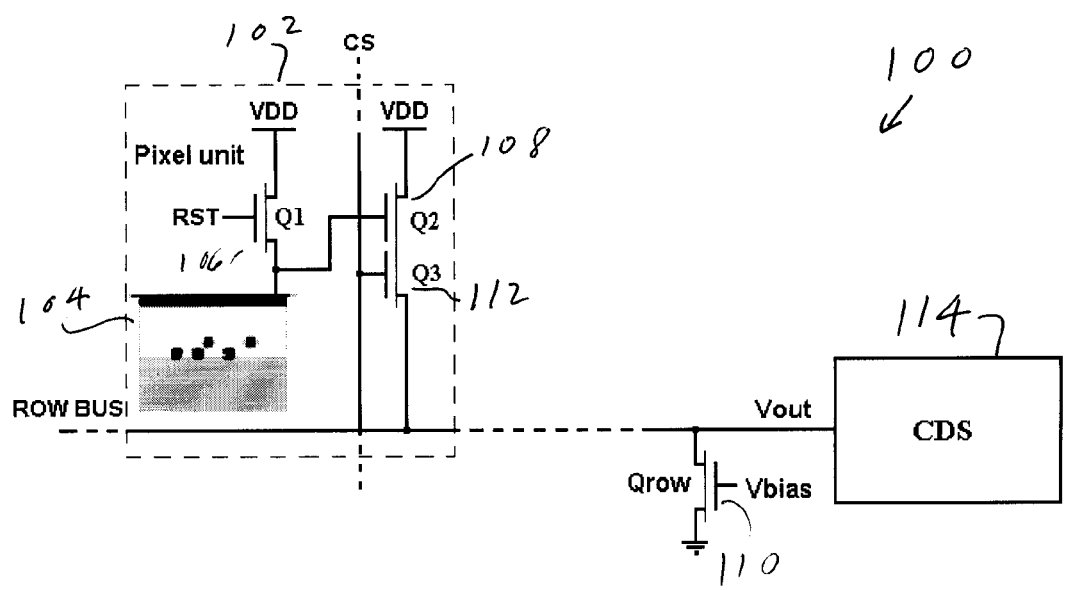
FIG. 1 is a circuit diagram of a conventional APS image sensor with a correlated double sampling unit.
Figure 2:
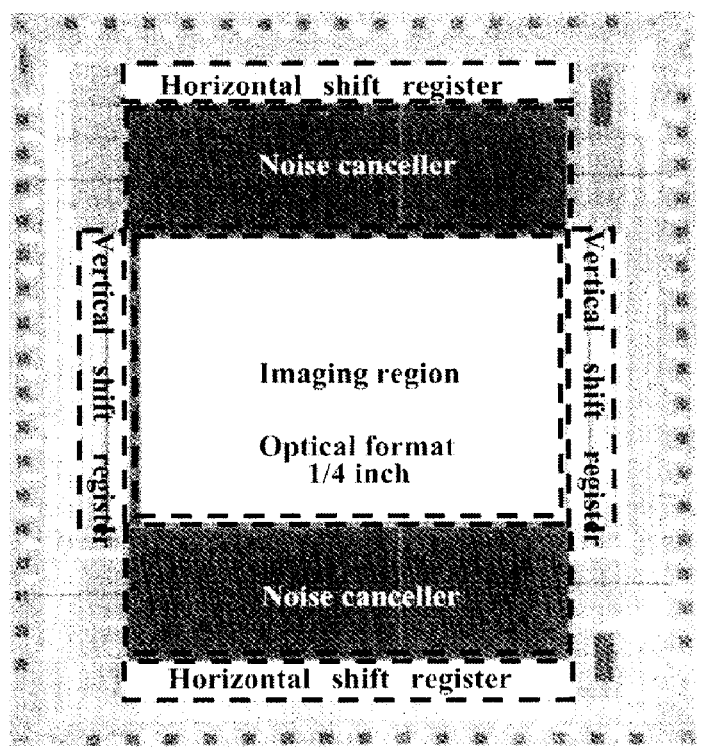
FIG. 2 is a chip micrograph of a conventional APS image sensor using CDS circuitry.
Figure 3:
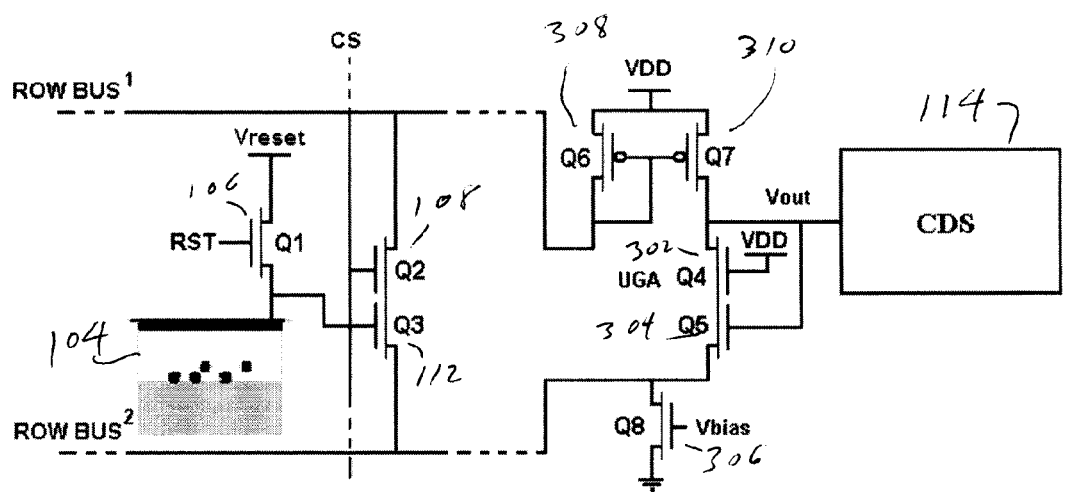
FIG. 3 is a circuit diagram of an active column sensor with a correlated double sampling unit.

Preferred embodiments of the present invention will be set forth in detail with reference to the drawings, in which like reference numerals refer to like elements throughout.

Figure 4:
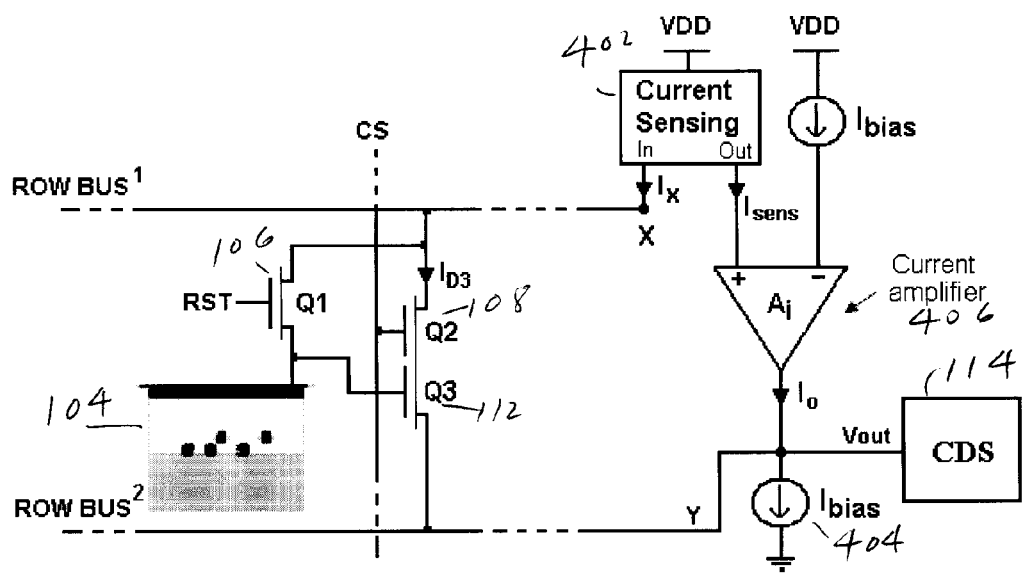
FIG. 4 is a circuit diagram of a general current-sensing active-pixel (CSAP) architecture configured for pixel readout operation.

A general CSAP architecture configured for pixel readout operation is shown in FIG. 4 as 400. The pixel is selected by asserting the transistor Q2 108, which connects the amplification transistor Q3 112 to the out-of pixel part of the readout circuit. The drain terminal of the transistor Q3 112 is connected through ROW_BUS1 line to an external current sensing circuit 402. The source terminal of Q3 is connected to the biasing current source $I_{bias}$ 404 and the output of the current feedback circuit (current amplifier) 406. The sensing circuit might be used to hold the potential $V_X$ of the ROW_BUS1 line to a fixed value. Consequently the parasitic capacitance of the ROW_BUS1 line does not influence the circuit speed. Also, if the potential of the ROW_BUS1 line $V_X$ is held fixed, there would be no additional current through the node X that supplies the parasitic capacitance and the current sensed by the sensing circuitry would only correspond to the transistor current ($I_X = I_{D3}$). The sensing circuit then outputs a current $I_{sens}$ that is proportional to $I_X$. The output current $I_{sens}$ is equal to the Q3 drain current ($I_{sens} = I_{D3}$) or it could equal its scaled version ($I_{sens} = kI_{D3}$) such that more current gain is provided by the external feedback circuit. The current feedback circuit (current amplifier) then finds the difference between the Q3 drain current and the biasing current $I_{bias}$ and multiplies that difference with a current gain of $A_i$. This amplified current difference is than fed back to the ROW-BUS2 line. If the sensing circuit provides a scaled version of the $I_{D3}$ current then the current feedback circuit would compare $I_{sens}$ with $kI_{bias}$ resulting in a total current gain of $kA_i$. This readout configuration provides negative feedback that effectively forces the drain current of Q3 to be equal to the biasing current $I_{bias}$. This feedback configuration results in faster response times and readout speeds that are increased by a factor equal to the current gain $A_i$ ($kA_i$).

The negative feedback operation provided by the CSAP structure is described in the following. If the input voltage value at the gate of Q3 increases, the gate-source voltage $V_{GS3}$ increases and the current in Q3 increases to $I_{D3}$, which is now larger than the biasing current $I_{bias}$. The sensing circuit senses this current increase and outputs a current that is equal to $I_{D3}$. The feedback circuit compares $I_{sens}$ and $I_{bias}$ multiplies their difference, and supplies the ROW_BUS2 line with the additional current $I_o = A_i^*(I_{sens} - I_{bias}) = A_i^*(I_{D3} - I_{bias})$. This additional current is positive, because $I_{sens} > I_{bias}$; hence, it charges the parasitic capacitance of the ROW_BUS2 line. As a result, the potential of the ROW_BUS2 line (which is at the same time the source terminal of Q3) increases to reduce the gate-source voltage of Q3 thereby reducing $I_{D3}$ to a value that is equal to $I_{bias}$. Similarly, if the input voltage value at the gate of Q3 decreases, the additional current $I_o$ becomes negative increasing the total current supplied to the ROW-BUS2 line to discharge the parasitic capacitance. As a result, the potential of the ROW_BUS2 line and source terminal of the Q3 decreases giving rise to the gate-source voltage $V_{GS3}$ and the subsequent increase of $I_{D3}$ to a value that is equal to $I_{bias}$. The transfer function and −3 dB frequency, which determines the circuit speed, of the CSAP architecture during the readout operation are given by Eq. (2) and (3), respectively. Hence, the −3 dB frequency is increased by a factor that is proportional to the current gain $A_i(kA_i)$ with respect to standard APS. During the readout operation the reset transistor Q1 is turned off.

$$H_{readout}(j\omega) = \frac{g_{m3}r_{ds3}}{1+g_{m3}r_{ds3}} \frac{1}{1+j\omega \frac{C_Y r_{ds3}}{(1+A_i)(1+g_{m3}r_{ds3})}} \quad (2)$$

$$f_{-3B} = \frac{(1+A_i)(1+g_{m3}r_{ds3})}{2\pi C_Y r_{ds3}} \quad (3)$$

Figure 5:
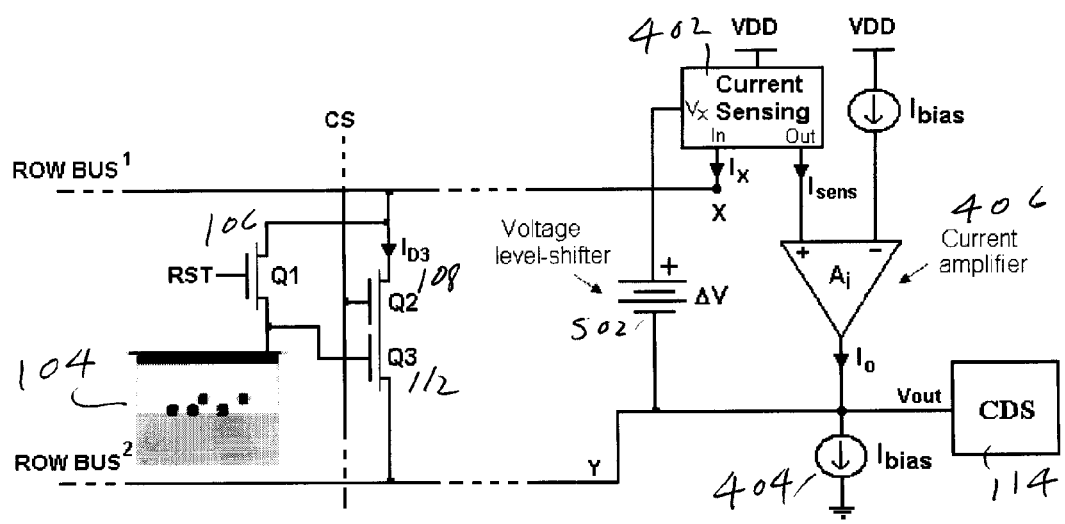
FIG. 5 is a circuit diagram of a general CSAP architecture with fixed $V_{ds3}$ architecture configured for pixel readout operation.

In another embodiment of this invention, the potential of the ROW_BUS[1] line ($V_X$) could be set with an additional voltage level-shifter circuit such that it is held above the potential of the ROW_BUS[2] line ($V_Y$) by a fixed voltage value of $\Delta V$ ($V_X = V_Y + \Delta V$). As a result, the drain-source voltage ($V_{ds3}$) of the in-pixel amplification transistor is held to a fixed value of $\Delta V$. Since the $V_{ds3}$ is fixed during the readout operation, the influence of the channel length modulation (finite output resistance $r_{ds3}$) may be neglected. Therefore, since the drain current $I_{D3}$ through the amplification transistor is independent on drain-source voltage, the large-signal response of the CSAP with fixed $V_{ds}3$ exhibits highly linear response. This advantage of the CSAP with fixed $V_{ds}3$ in terms of linearity is even more emphasized with technology scaling, where the channel length modulation and other second-order effects such as drain-induced barrier lowering (DIBL) may cause a high dependence of the drain current on the drain-source voltage resulting in a non-linear response of the standard APS. A general CSAP architecture with fixed $V_{ds}3$ is shown in FIG. 5 as 500, in which the voltage level shifter is designated 502. As shown in FIG. 5, the current sensing circuit is supplied with the voltage that is equal to $V_Y+\Delta V$. Then, the current sensing circuit holds the potential of the ROW_BUS$^1$ line ($V_X$) to the provided value $V_Y+\Delta V$ while sensing the current on that line ($I_x$).

Figure 6:
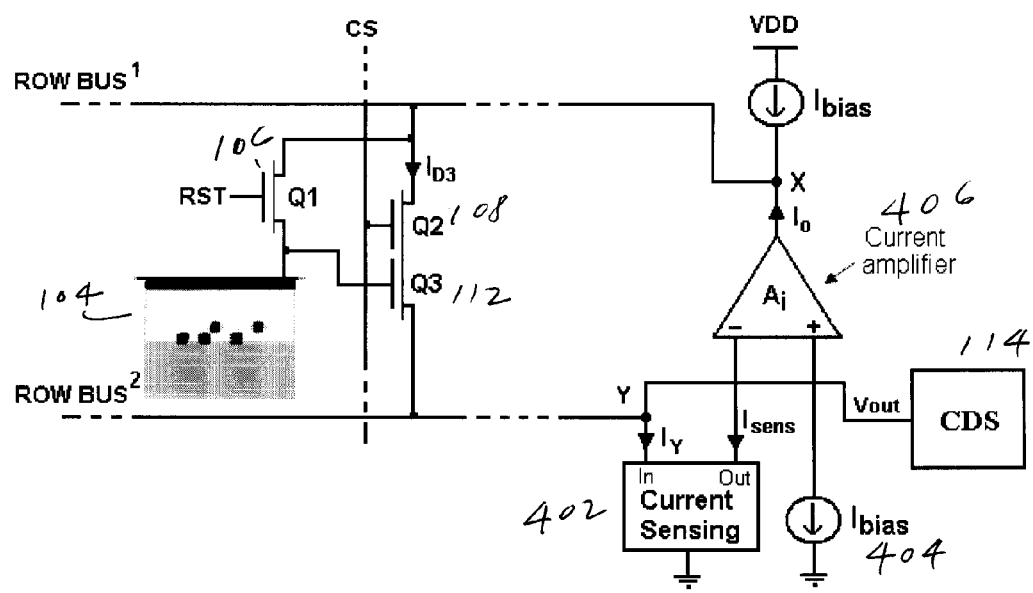
FIG. 6 is a circuit diagram of a general CSAP architecture configured for pixel reset operation.

It has been shown that the in-pixel transistor (Q3) could be reconfigured in a common-source amplifier architecture in order to attenuate the thermal (reset) noise injected by the reset switch into the photodetector element. In this active reset configuration, the reset switch is placed in the negative feedback of the amplifier. Ideally, assuming that the common-source amplifier has an infinite bandwidth, the total reset noise would be reduced by a factor of $$(1+A_{DC})\left(1+\frac{r_{ds3}}{R_{on}}\right);$$

where, $A_{DC}$ is the open-loop DC gain of the common-source amplifier ($A_{DC}=g_{m3}*r_{ds3}$), $R_{on}$ and $r_{ds3}$ are the on-resistances of the reset switch Q1 and amplification transistor Q3, respectively. However, the pixel-level common-source amplifier is heavily loaded by the parasitic capacitance $C_X$ of the readout lines, which significantly reduces its unity-gain bandwidth. The unity-gain bandwidth of such an amplifier is readily lower than the thermal noise cut-off frequency, so that the most of the thermal noise power is still injected into the photodetector without any attenuation. As a result, due to the reduced bandwidth of the in-pixel amplifier, the circuit reset noise attenuation capabilities are limited and only a modest noise reduction by a factor of 2 has been reported. Our current sensing method can be used to extend the bandwidth of the common-source amplifier reducing the reset noise that is injected by the reset switch Q1. The general CSAP architecture configured for the pixel reset operation is shown in FIG. 6 as 600. During the reset operation, the reset transistor Q1 and selection transistor Q2 of the pixel are asserted. The transistor Q2 connects the amplification transistor Q3 to the remainder of the reset circuit external to the pixel area. The transistor Q3 is in a common-source configuration; the drain terminal of Q3 is connected through the switch Q2 and ROW_BUS1 line to the bias current source $I_{bias}$ and the output of the current feedback circuit (current amplifier). Also, the source terminal of Q3 is connected to an external current sensing circuit. The sensing circuit holds the potential $V_y$ of the ROW BUS2 line to a fixed value therefore the parasitic capacitance of the ROW_BUS2 line does not influence the circuit speed. Also, there would be no additional current through the node Y that supplies the parasitic capacitance and the current sensed by the sensing circuit would only correspond to the transistor current ($I_y=I_{D3}$). The sensing circuit then outputs a current $I_{sens}$ that is proportional to $I_Y$. As a result, the output current $I_{sens}$ is equal to the Q3 drain current ($I_{sens}=I_{D3}$) or it could equal its scaled version ($I_{sens}=kI_{D3}$) such that more current gain is provided by the external feedback circuitry. The current feedback circuit (current amplifier) then finds the difference between the biasing current $I_{bias}$ (or its k times scaled version) and the drain current of Q3 (or its k times scaled version) and multiplies that difference with a current gain of $A_i$. This amplified current difference is then fed back to the ROW-BUS1 line. Similar to the readout phase operation, the reset configuration provides negative feedback that effectively forces the drain current of Q3 to be equal to the bias current $I_{bias}$. This feedback operation effectively increases the open-loop gain and unity-gain frequency of the common-source Q3 amplifier.

The negative feedback provided by the CSAP structure during the reset operation may be described as follows. If the input voltage value at the gate of Q3 increases, the gate-source voltage $V_{GS}3$ increases and Q3 starts to conduct more current $I_{D3}$, which is now larger than the biasing current $I_{bias}$. The sensing circuit senses this current increase and generates a current that is equal (or proportional with constant k) to $I_{D3}$ at its output. The feedback circuit compares $I_{sens}$ and $I_{bias}$ (or their k times scaled versions), multiplies their difference, and supplies the ROW_BUS1 line with the additional current $I_o=A_i*(I_{bias}-I_{sens})=A_i*(I_{bias}-I_{D3})$. This additional current is negative, because $I_{sens}>I_{bias}$, and is subtracted from the bias current $I_{bias}$. As a result, the supply current on the ROW_BUS1 line is reduced which causes the potential of the ROW_BUS1 line (which is also the potential of the drain terminal of Q3) to decrease. The voltage decrease at the drain of Q3 is fed back through the switch Q1 to the gate of Q3 decreasing its initial rise. Similarly, if the input voltage value at the gate of Q3 decreases $I_{D3}3$ decreases and the additional current $I_o$ becomes positive. This result in an increase of the total current supplied to the ROW-BUS I line, so that the potential of the ROW_BUS1 line and drain terminal of Q3 increases. This voltage increase gives rise to the gate-source voltage $V_{GS}3$ and increases $I_{D3}$ to a value that is equal to the $I_{bias}$. The transfer function of the equivalent common-source amplifier during the reset operation and its unity-gain frequency $f_{ta}$ are given by Eq. (4) and (5), respectively. Since the unity-gain frequency of the amplifier proposed in the above-referenced Yang et al paper equals to $g_{m3}/(2\pi C_X)$, the feedback operation of the CSAP architecture increases the unity-gain frequency and bandwidth of the common-source amplifier by a factor of $A_i(kA_i)$. Therefore, more reset noise power will fall into the amplifier's bandwidth and will be attenuated by the negative feedback of the common-source amplifier. Assuming that the cut-off frequency of the thermal noise is lower than the unity-gain frequency given by Eq. (5), the total reset noise would be attenuated by the amplifiers open-loop DC gain $(g_{m3}*r_{ds3})*(1+r_{ds3}/r_{ds1})$.

$$H_{reset}(j\omega) = -\frac{g_{m3}r_{ds3}}{1+j\omega\frac{C_X r_{ds3}}{1+A_i}} \quad (4)$$

$$f_{ta} = \frac{(1+A_i)g_{m3}}{2\pi C_X} \quad (5)$$

In another embodiment of the present invention, the amplification transistor Q3 and access transistor Q2 are interchanged such that the access transistor connects/disconnects the source of the Q3 to/from the ROW_BUS$^2$ line instead of ROW_BUS$^1$ line.

Similarly to the method proposed in Yang et al, the reset noise injected into the photo-detector could be further suppressed by using the access transistor Q2 as a cascode device (saturation mode) rather than a switch (triode region). This cascode type common-source amplifier configuration is achieved by applying an appropriate voltage bias on the CS line such that both transistors Q2 and Q3 are always in saturation region during the reset operation. The resulting open-loop transfer function of the common-source amplifier is given by Eq. (6). The open-loop DC gain is increased $g_{m2}*r_{ds2}$ times with respect to the configuration where the access transistor Q2 is biased in triode mode. The unity-gain frequency of this cascode type common-source configuration is equal to the unity-gain frequency of the configuration where the access transistor is biased in triode region, shown in Eq. (5). We conclude that if the access transistor is biased in saturation region, the reset noise reduction is further improved. This improvement results from the increased open-loop DC gain of the amplifier provided that the current sensing circuitry maintains fairly high circuit speed such that most of the reset noise power lays within the circuit bandwidth.

$$H_{reset}(j\omega) \cong -\frac{(g_{m3}r_{ds3})(g_{m2}r_{ds2})}{1+j\omega\frac{C_X g_{m2}r_{ds2}r_{ds3}}{1+A_i}} \qquad (6)$$

Figure 7:
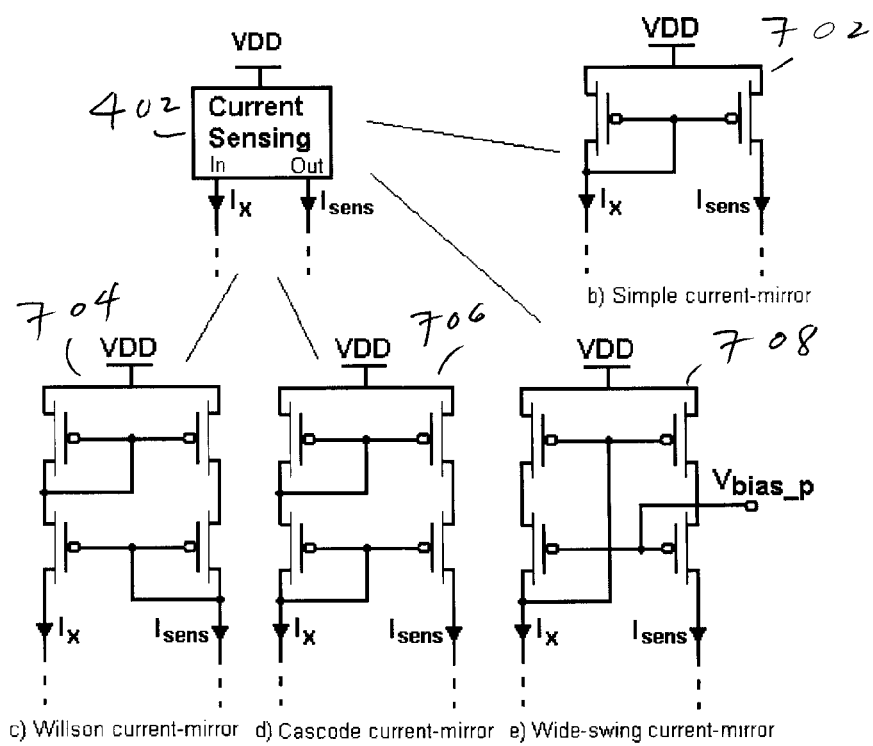
FIG. 7 is a circuit diagram of various current-mirror implementations of the current-sensing circuit of FIGS. 4-6.

The current sensing circuit shown in FIG. 4 might be implemented as a current mirror circuit as shown in FIG. 7. The possible implementations are a simple current-mirror 702, Wilson current mirror 704, cascade current mirror 706, and wide-swing current mirror 708.

Figure 8:
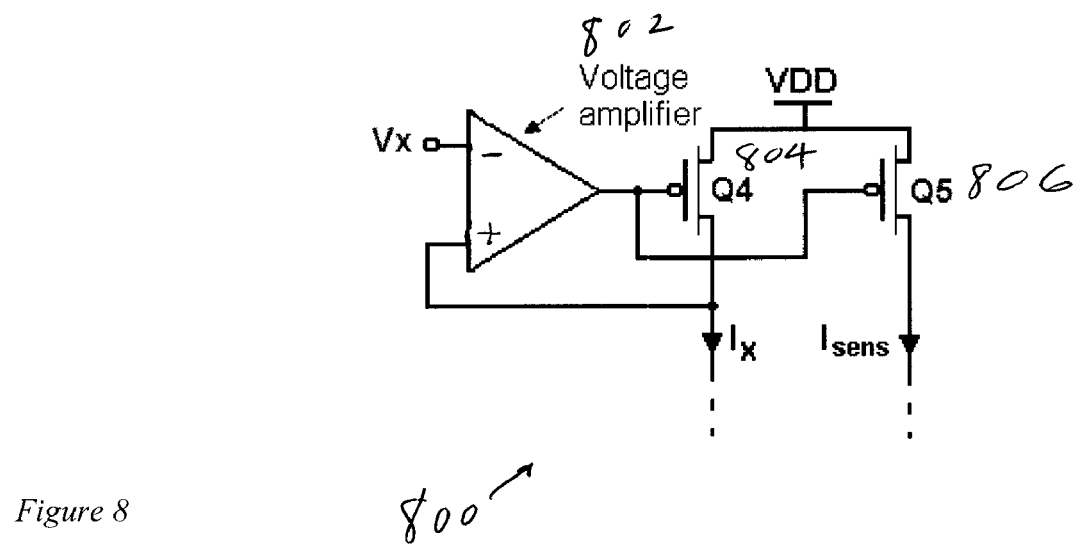
FIG. 8 is a circuit diagram a current sensing circuit with active control over the ROW_BUS[1] line potential.

However, in the implementations shown in FIG. 7, the current sensing circuit does not fix the potential of the ROW_BUS[1] line ($V_X$). As a result, the parasitic capacitance of that line must be taken into account. A better implementation of the current sensing circuit would be one that actively holds the potential of the ROW_BUS[1] line to a fixed value $V_X$. One possible implementation of the current sensing circuit that actively holds the potential of the ROW_BUS[1] line to the $V_X$ value is shown in FIG. 8 as 800. In this implementation, which has a voltage amplifier 802 and transistors Q4 804 and Q5 806, the CSAP with fixed $V_{ds3}$ would be easily implemented, where the $V_X$ node of the voltage amplifier shown in FIG. 8 would be directly driven from the voltage level-shifter circuit and held to $V_Y+\Delta V$ value.

Figure 9:
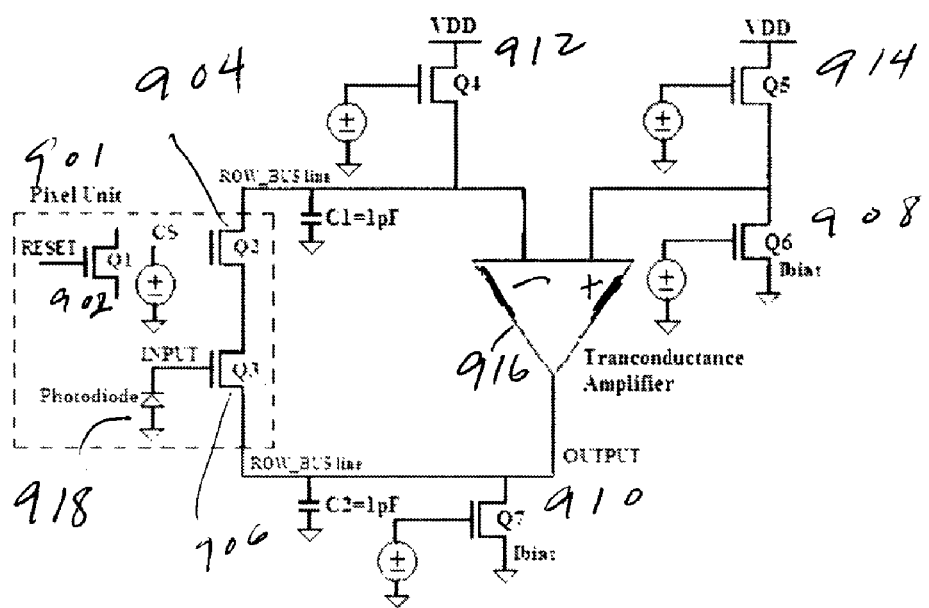
FIG. 9 is a circuit diagram of a simulated CSAP architecture.

The proposed CSAP design was simulated using a resistive type of current sensing circuit, the schematic of which is shown in FIG. 9 as 900. The pixel unit is designated 901. Transistors Q1 902, Q2 904, Q3 906, Q6 908 and Q7 910 are NMOS. PMOS transistors Q4 912 and Q5 914 operate in the linear region and connect to the input of the transconductance amplifier 916, which have an equivalent resistance R. The total gain of this current sensing circuit is $A=g_m*R_{on}$, where $g_m$ is the transconductance of the amplifier. The gain could be obtained by choosing the value of $R_{on}$ and $g_m$, properly, which will ensure this CSAP design with negative feedback to have faster response time and readout speed than the standard APS design. Table. 1 below shows the comparison of the settling times between the standard APS design and the simulated CSAP design with different gain. In this particular circuit, the photodetecting element is a photodiode 918. When $g_m$ and $R_{on}$ goes over certain value, the oscillation characteristic at the output will be introduced. This happened since the distance between the two poles, which generated by the two parasitic capacitances, is smaller than the amplitude of the loop gain of the circuit in dB scale. To solve this problem, we can simply decrease Ron to get the output without oscillation.

The parasitic capacitance of $C_2$ of the bottom ROW_BUS line is the dominant parameter over $C_1$ of the top ROW_BUS line. Changing $C_2$ will affect the response time and readout speed of the proposed design effectively, such as increasing $C_2$ X times with $C_1$ fixed will results in X times longer settling times.

TABLE 1

| Settling Time | Charging (ns) | Discharging (ns) |
|---|---|---|
| Standard APS | 480 | 130 |
| CSAP with A = 10 | 47 | 12 |
| CSAP with A = 20 | 23 | 6 |
| CSAP with A = 40 | 11 | 2.5 |

While a preferred embodiment of the present invention and various modifications thereof have been set forth above, those skilled in the art who have reviewed the present disclosure will readily appreciate that other embodiments can be realized within the scope of the invention. The photo-detectors that are shown in the preferred embodiments of this invention could be implemented as photodiodes (three-transistor 3T CSAP readout structure), photogates with transfer gate (4T CSAP readout structure with photogates), and pinned diodes with floating diffusions and transfer gate (4T CSAP readout structure with pinned diode). Therefore, the invention should be construed as limited only by the appended claims.

We claim:

1. An active pixel sensor image sensor comprising:

a plurality of sensing elements for a plurality of pixels, the plurality of sensing elements being organized into a plurality of rows;

a row bus for each of the rows of sensing elements;

an in-pixel readout transistor for each of the sensing elements;

a current-sensing circuit for each of the rows, the current-sensing circuit being external to the pixels and connected to the in-pixel readout transistor of each of the pixels in said each of the rows by the row bus, for sensing a current through the in-pixel readout transistor; and a feedback circuit for each of the rows, external to the pixels, for supplying a feedback to charge a read-line parasitic capacitance of the row bus in accordance with the current sensed by the current-sensing circuit.

2. The image sensor of claim 1, further comprising, for each of the rows, a correlated double sampling circuit for sampling two values on an output of each of the in-pixel readout transistors (one value after the reset phase and one after the integration phase) and taking the difference between the two values.

3. The image sensor of claim 1, wherein each said row bus comprises two row bus lines.

4. The image sensor of claim 3, further comprising a voltage level shifter for each of the rows, the voltage level shifter maintaining a constant voltage difference between the two row bus lines.

5. The image sensor of claim 4, wherein the current-sensing circuit comprises a voltage amplifier having a first input connected to the voltage level shifter.

6. The image sensor of claim 5, wherein an output of the voltage amplifier is connected to a first transistor for sensing the current and to a second transistor for outputting a signal to the feedback circuit representing a level of the feedback which the feedback should output, and wherein an output of the first transistor is fed back to a second input of the voltage amplifier.

7. The image sensor of claim 6, wherein the feedback circuit comprises a current amplifier.

8. The image sensor of claim 1, wherein the readout transistor is in a common-source configuration.

9. The image sensor of claim 1, wherein the current-sensing circuit outputs a signal to the feedback circuit representing a level of the feedback which the feedback should output.

10. The image sensor of claim 9, wherein the signal output by the current-sensing circuit is a current which is proportional to the current sensed by the current-sensing circuit.

11. The image sensor of claim 10, wherein the signal output by the current-sensing circuit is a current which is equal to the current sensed by the current-sensing circuit.

12. The image sensor of claim 10, wherein the signal output by the current-sensing circuit is a current which is scaled from the current sensed by the current-sensing circuit.

* * * * *